United States Patent [19]

Wintermeyer et al.

[11] 4,414,401

[45] Nov. 8, 1983

[54] PROCESS FOR SEPARATING AND RECOVERING METAL CATALYSTS

[75] Inventors: Willi Wintermeyer, Seeheim-Jugenheim; Rolf Wittmann, Mühltal; Jürgen Butzke, Dieburg, all of Fed. Rep. of Germany

[73] Assignee: Merck Patent Gesellschaft Mit Beschränkter Haftung, Darmstadt, Fed. Rep. of Germany

[21] Appl. No.: 316,381

[22] Filed: Oct. 29, 1981

[30] Foreign Application Priority Data

Oct. 29, 1980 [DE] Fed. Rep. of Germany ....... 3040631

[51] Int. Cl.$^3$ .................. C07D 407/00; C07D 317/00
[52] U.S. Cl. ..................................... 549/370; 549/448
[58] Field of Search ............................... 549/370, 448

[56] References Cited

U.S. PATENT DOCUMENTS 2,301,811 11/1942 Reichstein ........................... 549/370

OTHER PUBLICATIONS

Reichstein et al., Helv. Chim. Acta, 17 (1934), pp. 311–328.
Advances in Carbohydrate and Biochem. 37 (1980), 89–105.

Primary Examiner—Ethel G. Love
Attorney, Agent, or Firm—Millen & White

[57] ABSTRACT

A process is provided for separating and recovering solid, metal catalysts from reaction mixtures in which they are dispersed, with cross-flow filtration using membrane separation devices. The process is particularly useful for separating gelatinous catalyst sludges, e.g., nickel hydroxide, used in oxidizing diacetone sorbose.

9 Claims, No Drawings

PROCESS FOR SEPARATING AND RECOVERING METAL CATALYSTS

BACKGROUND OF THE INVENTION

The present invention relates to a process for separating and recovering solid metal catalysts from reaction mixtures in which they are dispersed, with cross-flow filtration using membrane separation devices.

Many metals, either in metallic form or in the form of compounds, are used as catalysts in numerous chemical processes. Since the catalyzed reaction as a rule takes place on the surface of the catalyst, the structure of the catalyst plays an essential part in its effectiveness. The metals used as catalysts are frequently quite expensive, and, moreover, must under no circumstances pass into effluents, for reasons of environmental protection. It is therefore necessary to remove the catalysts substantially quantitatively from the reaction mixture.

Catalysts have hitherto customarily been separated, using appropriate separation devices, by filtration, sedimentation or with the aid of separators in a so-called "dead end" filtration process, that is, the catalyst is compressed to a filter cake and is isolated in an essentially dry form. However, this process has a number of disadvantages. Firstly, gelatinous catalysts which are difficult to filter, such as, for example, nickel hydroxide sludges, can be filtered only with the aid of filtration auxiliaries. This means, however, that foreign substances are admixed with the catalyst, which, for this reason, cannot be re-used directly but must be regenerated, in processes which are frequently troublesome. Secondly, the structure of the very finely divided catalyst is frequently damaged as a result of the catalyst being compressed as a filter cake, so that it must likewise be regenerated before being re-used.

OBJECTS OF THE INVENTION

Accordingly, one object of the present invention is to provide a process in which solid, metal catalysts can be separated and recovered from any desired reaction mixture, preferably in a form in which they can be re-used for catalysis immediately, with substantially no loss in their catalytic activity.

Upon further study of the specification and appended claims, further objects and advantages of this invention will become apparent to those skilled in the art.

SUMMARY OF THE INVENTION

These and other objects are achieved by a process for separating and recovering a solid, metal catalyst from a reaction mixture in which it is dispersed, comprising circulating said reaction mixture in contact with the surface of a membrane, at a flow rate such that its Reynolds number is at least about 1000, the pressure drop across the membrane being about 0.5–100 bar; periodically reversing the pressure drop across the membrane for a time interval sufficient to flush occluded catalyst out of the pores of the membrane by the brief reverse flow of permeate; and separately recovering a permeate, and a retentate of recovered catalyst.

DETAILED DISCUSSION

It has now been found that, by cross-flow filtration with the aid of a membrane separation process, it is possible to obtain catalysts retaining their active structure from a reaction mixture, without the use of filtration auxiliaries.

The advantages of the process according to the invention are, in particular, that the catalyst recovered in the form of a concentrated suspension can be re-used immediately, without expensive regeneration, and during re-use shows substantially no reduction in activity.

The process can be applied to all types of catalysts employed as solids, such as, for example, hydrogenation catalysts and oxidation or reduction catalysts. Illustrative examples include palladium-on-charcoal, platinum oxide, Raney nickel and nickel hydroxide. The process according to the invention especially represents a considerable industrial advance in the separation of gelatinous nickel hydroxide sludges, which are employed on a large scale, for example, as catalysts in the oxidation of diacetone sorbose.

In principle, all membrane separation processes, such as reverse osmosis, electrodialysis, ultrafiltration and microfiltration, can be employed. In reverse osmosis, electrodialysis and ultrafiltration units, it is also possible to separate off catalyst suspensions with a particle size smaller than the pore diameter of microfiltration membranes, e.g., a particle size of 0.001–0.1 $\mu$m. Electrodialysis is preferably used for separating off low molecular weight ionic substances from catalyst suspensions containing non-ionic substances. Membranes of polyethylene, polypropylene, polyamide, cellulose esters, polysulfones, polyacrylates or polyimides are as a rule used in these units. Very finely dispersed catalysts, having a particle size of, e.g., 0.1–10 $\mu$m, can also be separated off using these membranes, but their permeate output is only about 1/10 of the output of microfiltration membranes. Where possible, e.g., for catalysts having a particle size of 2–50 $\mu$m, preferably 2–30 $\mu$m, microfiltration is thus preferred, because of the easy and rapid separation which may be achieved, at relatively low pressures.

Any conventional microfiltration membranes can be used in microfiltration units. These membranes as a rule have pore diameters of about 0.01–50 $\mu$m and are usually made of polyethylene, polypropylene or polyamide. Suitable such microfiltration membranes include, e.g., Accurel ®, Acroflux, Selecta 1121, available commercially from Membrana, Gilman, Nucleopore, Millipore, Berghof, Schleicher & Schüll.

Conventional devices can be used for carrying out the process. For electrodialysis, these devices commonly take the form of stack cells which have been built up in accordance with the filter press principle, and in which anion exchange membranes and cation exchange membranes are arranged alternately. The membranes for reverse osmosis, ultrafiltration and microfiltration can likewise be built up in the filter press arrangement. However, these membranes are generally used in the form of hollow fibers or tubes with internal diameters of about 0.3–30 mm, large numbers of the hollow fibers or tubes being bundled together to form a module, thereby providing a very large membrane area in a small space.

The units are in all cases operated with at least a retained material circulation and, if desired, a permeate circulation, between which there is a pressure drop of about 0.5–100 bars, depending on the nature of the membrane used. In the case of the micofiltration membranes preferably used, a pressure drop of about 0.5–2 bars is normally sufficient. Permeate outputs of about 100 to 1,500 liters per m$^2$ of membrane area and per hour are thereby established.

In order to reduce the viscosity of the circulating solutions or suspensions, the process is preferably carried out at an elevated temperature, if the product and the membrane permit.

In addition to the pressure drop between the permeate chamber and the retained material chamber, a high flow rate of the suspension on the retained material side parallel to the membrane surface is essential for a high and uniform permeate output. The solids retained by the membrane should be washed off the membrane surface as a result of the powerful flow. The flow rates used in this cross-flow process should be high enough to give a flow with a Reynolds number of at least about 1,000. Assuming the viscosity of the suspension is about 1.5 mPas and the tube diameter is about 6 mm, this corresponds to a flow rate of about 0.25 m/second. Other flow rates of course result with other viscosities and other hollow fiber diameters. Flow with a Reynolds number of about 2,000–20,000 is preferably established.

In spite of this powerful flow along the membrane surface, partial blockages of the membrane pores may occur, especially with very fine-particled suspensions, whereupon the permeate output drops. It has therefore proved advantageous to periodically reverse the pressure drop between the permeate chamber and the retained material chamber for a short time interval, e.g., 1–5 seconds, at essentially regular intervals, e.g., after a filtration time of about 1–5 minutes. The pressure reversal should be effected sufficiently often and for a sufficiently long time interval so that the membrane pores can be flushed free of occluded catalyst particles by the now reversed flow of the permeate back into the retained material. A substantially constant and high permeate output throughout the entire separation can be achieved in this manner.

The separation can be carried out discontinuously, in a batchwise manner. However, a continuous procedure is also possible by connecting several units in series, in the form of a cascade. Towards the end of the separation, when the solids content of the suspension of retained material has increased greatly, the retained material can be diluted with a solvent, e.g., water, in order to keep the mixture pumpable. The catalyst is thereby washed, and can be removed in pure form, substantially free of reaction products.

The catalysts can be separated from aqueous solutions or from solutions of organic solvents. When the membrane is to be used in contact with a different solvent, it should be progressively conditioned to the particular solvent employed. This changeover of membranes is known, and is described, for example, in German Offenlegungsschrift No. 2,946,067.

When the separation has ended, the concentrated catalyst suspension can be removed and can be re-used directly in the reaction to be catalyzed. The invention thus provides a valuable process for separating and recovering fully active metal catalysts.

While membrane separation of solids from liquids is old, as disclosed in Perry et al., "Chemical Engineers' Handbook, 5th Ed.," pages 17-40 to 17-43 (McGraw-Hill, 1973), it could not be expected that it would be possible to recover solid catalysts from reaction solutions using membrane separation, whereby the catalysts retain their full activity. Especially the gelatinous nickel hydroxide catalysts hitherto could be separated only with the help of filtration auxiliaries which made it impossible to re-use the catalyst without working up. Beside this the catalyst during separation lost its active structure which made it impossible to reuse it without reactivation. It could not be foreseen that with the use of membrane separation processes such an improvement would be possible.

The process of the invention is particularly well suited for use in the catalytic steps involved in converting glucose to ascorbic acid. A known industrial route for effecting this conversion involves the steps of catalytically hydrogenating glucose to sorbitol, typically in the presence of Raney nickel catalyst, and separately recovering the catalyst and the sorbitol; oxidizing the sorbitol to sorbose; converting the sorbose to diacetone sorbose; catalytically oxidizing the diacetone sorbose to diacetone ketogulonic acid in aqueous alkaline solution, in the presence of nickel hydroxide catalyst, and separately recovering the catalyst and the diacetone ketogulonic acid; and converting the diacetone ketogulonic acid to ascorbic acid. Such process is described in Advances in Carbohydrate and Biochemistry, Vol 37 (1980) page 89-105 T. Reichstein and A. Grüssner, Helv. Chim. Acta 17 (1934) 311-328.

The catalytic hydrogenation step in this process is simplified by separating the Raney nickel catalyst from the sorbitol solution using the membrane separation process of the invention, preferably with a microfiltration tube module of, e.g., polypropylene tubes. The recovered catalyst retentate, which can optionally be diluted with water and further concentrated, retains substantially the same activity and is recycled back to the hydrogenation, while the sorbitol solution passes through the membrane substantially free of catalyst contamination.

The glucose hydrogenation is advantageously effected with concentrated solutions, which are also quite viscous. Accordingly, the membrane separation process is advantageously effected at a temperature higher than ambient, e.g., 30°–60° C., preferably about 40° C. The high viscosity of the solution is correlated with a lower Reynolds number at comparable flow rates to a less viscous solution, and a flow rate corresponding to a Reynolds number of about 1000 can be used.

A further correlate of the high viscosity and concentration in this step is a relatively slow rate of permeate output. Somewhat more frequent and/or longer pressure drop reversals are also helpful in avoiding too rapid a reduction in permeate output.

Several water washes and concentrations of the catalyst are preferably effected, prior to recycling the catalyst to the reaction, although this is not required.

It is also particularly advantageous to use the present process to separate gelatinous nickel hydroxide catalyst from the aqueous alkaline solution in which diacetone sorbose is oxidized to diacetone ketogulonic acid in the foregoing route to ascorbic acid. This avoids the use of filtration auxiliaries which must be removed before the catalyst can be recycled.

Preferably, the separation is effected using microfiltration tube modules, e.g., with polypropylene tubes. Periodic pressure drop reversal and backwash for, e.g., 1–5 seconds every 1–5 minutes results in only a low reduction in the rate of permeate output. Flow rates corresponding to Reynolds numbers of about 2000–20000 are advantageously used to concentrate the gelatinous catalyst sludge. After optional water wash and concentration, the catalyst is recycled directly to the oxidation with substantially no loss of activity and without regeneration.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE 1

1,000 l of an aqueous alkaline suspension containing 0.3 kg of a nickel hydroxide catalyst, having a particle size of about 30 $\mu$m, (e.g., a reaction solution from the oxidation of diacetone sorbose to give diacetone ketogulonic acid) are pumped in circulation over a microfiltration tube module (polypropylene tubes with an internal diameter of 6 mm, mean pore diameter of about 0.2 $\mu$m and effective filter area of 0.66 m$^2$). Under an entry pressure of 1.4 bars and a flow rate along the membrane surface of 2.5 m/second (a Reynolds number of about 3,000) at about 40° C., the permeate output is initially about 750 l/hour.m$^2$. In the course of the filtration, the permeate output falls, but it is kept overall at a high level by periodically backwashing the permeate for about 2 seconds, at intervals of about 2 minutes. After a filtration time of 2.5 hours, the suspension has been concentrated to about 10 l, which corresponds to an average permeate output of 624 l/m$^2$.hour. After adding 50 l of water, the suspension is concentrated again to about 7–10 l. After the nickel content has been determined by customary methods, the suspension can be used again for the next reaction. No decrease in the activity of the catalyst is detected, even when the catalyst is repeatedly recovered and used again without being regenerated.

EXAMPLE 2

70 l of a methanolic/aqueous hydrogenation solution of an aromatic nitro compound containing 0.36 kg of Pd-on-charcoal (5% of Pd), having a particle size of about 100 $\mu$m, is pumped in circulation over a hollow module (63 polypropylene filaments with a diameter of 1.5 mm, a length of 230 mm, a mean pore diameter of 0.2 $\mu$m and an effective filter area of 0.068 m$^2$) at a flow rate of 1.5 m/second (a Reynolds number of about 3,000) at 30° C., under an entry pressure of 1.0 bar and an exit pressure of 0.3 bar. The permeate output is 1,470 l/m$^2$.hour, which is maintained by periodic pressure drop reversal. Towards the end of the separation, the retained material is diluted with 10 l of methanol/water and concentrated again to about 2 l. The Pd-on-charcoal suspension thus obtained can be used directly for the next hydrogenation.

Similarly, catalyst-containing reaction mixtures from the catalytic hydrogenation of aromatic nitro compounds including, e.g., nitrobenzene, 5-nitrochinolin, p-nitrobenzoic acid, 2-nitrofuran, dinitrophenol, 1-Phenyl-2-nitropropene, $\alpha$-nitrostilbene may be separated, and the catalyst recovered in active form, by this procedure.

EXAMPLE 3

60 kg of a hydrogenation solution, containing sulfuric acid, of an aromatic nitroso compound containing 0.9 kg of Pd-on-charcoal (5% of Pd), having a particle size of about 150 $\mu$m, is pumped in circulation over a hollow fiber module as in Example 2 with a flow rate of 1.8 m/seconds (a Reynolds number of about 1,500) at 30°–35° C. and under an entry pressure of 1.0 bar and an exit pressure of 0.3 bar. The permeate output is kept at a high level by regular counterwashing (2 seconds), and is on average 353 l/m$^2$.hour. When the suspension has been concentrated to about 5 kg, 5 l of water are added and the suspension is concentrated again to about 5 kg, this operation being repeated twice more. The Pd-on-charcoal suspension thus obtained can be employed immediately for the next hydrogenation.

Similarly, catalyst-containing reaction mixtures from the catalytic hydrogenation of aromatic nitroso compounds including, e.g., nitrosobenzene, diphenylnitrosamin, N-nitrosomorpholin, o-nitrosobenzoic acid, p-nitrosophenol, 4-nitrosopyrazole, p-nitrosodiphenylamine may be separated, and the catalyst recovered in active form, by this procedure.

EXAMPLE 4

136 kg of a highly viscous sugar hydrogenation solution ($\eta=14$ mPas) containing about 2 kg of Raney nickel) is pumped in circulation over a tube module (65 polypropylene tubes with a diameter of 6 mm, a length of 500 mm, a mean pore diameter of 0.2 $\mu$m and an effective filter area of 0.33 m$^2$) with a flow rate of 2.5 m/second (a Reynolds number of about 1,000) at 40° C. and under an entry pressure of 1.5 bars and an exit pressure of 1.4 bars. The initial permeate output of about 80 l/m$^2$.hour falls rapidly to 36 l/m$^2$.hour, so that counterwashing has to be carried out for 2 seconds after each 1.5 minute interval. Towards the end of the separation, water is added and the mixture is concentrated again, this operation being repeated several times. The catalyst suspension thus obtained can be employed immediately in the next hydrogenation.

Similarly, catalyst-containing reaction mixtures from the catalytic hydrogenation of sugars and similar carbonyl compounds including, e.g., glucose, fructose, sorbose may be separated, and the catalyst recovered in active form, by this procedure.

EXAMPLE 5

A hydrogenation solution, containing sulfuric acid, of an aromatic nitro compound containing a very finely divided Pd catalyst, having a particle size of about 50 $\mu$m, is filtered, at 35° C., over an ultrafiltration tube module which comprises 16 polysulfone tubes (internal diameter: 11 mm, membrane area: 0.76 m$^2$) connected in series and has a molecular separation limit of about 20,000. The entry pressure is 7 bars and the exit pressure is 4 bars. At a flow rate of about 2 m/second and a viscosity of 1.5 mPas, the Reynolds number is about 15,000. The filtration output is initially 38 l/hour, and decreases to about 23 l/hour after 4 hours. When the concentrate has been drained, the catalyst can be used again.

Similarly, catalyst-containing reaction mixtures from the catalytic hydrogenation of compounds including, e.g., nitrobenzene, 5-nitrochinolin, p-nitrobenzoic acid, 2-nitrofuran, dinitrophenol, 1-Phenyl-2-nitropropene, $\alpha$-nitrostilbene, nitrosobenzene, diphenylnitrosamin, N-nitrosomorpholin, o-nitrosobenzoic acid, p-nitrosophenol, 4-nitrosopyrazole, p-nitrosodiphenylamine may be separated by ultrafiltration, and the very finely divided catalyst recovered in active form, by this procedure.

The preceding examples can be repeated with similar success by substituting the generically or specifically described reactants and/or operating conditions of this invention for those used in the preceding examples. From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for producing diacetone ketogulonic acid, wherein diacetone sorbose is oxidized in aqueous alkaline solution in the presence of a suspended nickel hydroxide catalyst, and the gelatinous catalyst is separated from diacetone ketoglulonic acid and separately recovered, the improvement comprising separating the gelatinous nickel hydroxide catalyst by a process comprising circulating the aqueous reaction mixture in contact with the surface of a microfiltration membrane at a flow rate such that its Reynolds number is at least about 1000, the pressure drop across the membrane being about 0.5–100 bar; periodically reversing the pressure drop across the membrane for a time interval sufficient to flush occluded catalyst out of the pores of the membrane by the brief reverse flow of permeate; and separately recovering a permeate containing diacetaone ketogulonic acid, and a retentate of concentrated, substantially fully active nickel hydroxide catalyst which is uncontaminated by filter aids and suitable for recycling directly to the oxidation without regeneration.

2. A process according to claim 1, wherein said membrane has pores with a mean pore diameter of 0.1–0.5 $\mu$m.

3. A process according to claim 1, wherein said microfiltration membrane is in the form of a bundle of hollow fibers having average internal diameters of about 0.3–30 mm, and the pressure drop across the membrane is about 0.5–2 bars.

4. A process according to claim 1, wherein the reversal of the pressure drop across the membrane is effected for a time interval of about 1–5 seconds at a periodicity of about 1–5 minutes.

5. A process according to claim 1, wherein the flow rate corresponds to a Reynolds number of about 3000.

6. A process according to claim 1, wherein said membrane is made of polyethylene, polypropylene or polyamide.

7. A process according to claim 6, wherein said membrane is a polypropylene microfiltration tube module, having tubes with an internal diameter of about 6 mm and a mean pore diameter of about 0.2 $\mu$m.

8. A process according to claim 7, wherein the pressure drop across the membrane is about 0.4 bars.

9. A process according to claim 1, which further comprises recycling the recovered catalyst directly to the oxidation without regeneration and with substantially no loss in catalytic activity.

* * * * *